July 7, 1959  J. P. GERHAUSER  2,893,664
SEAM FOR WIRE FABRIC AND METHOD OF MAKING SAME
Filed March 16, 1955
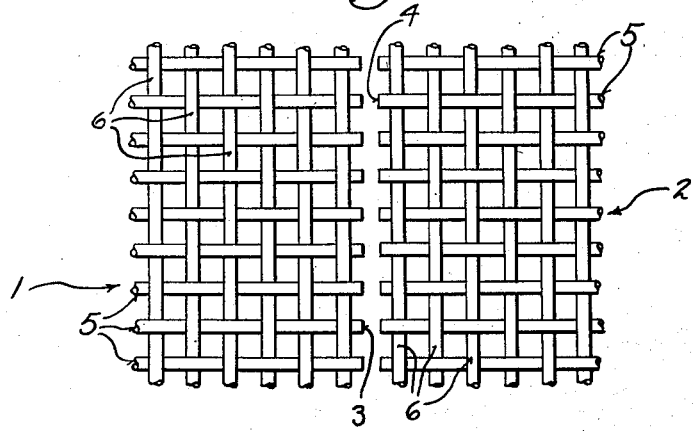
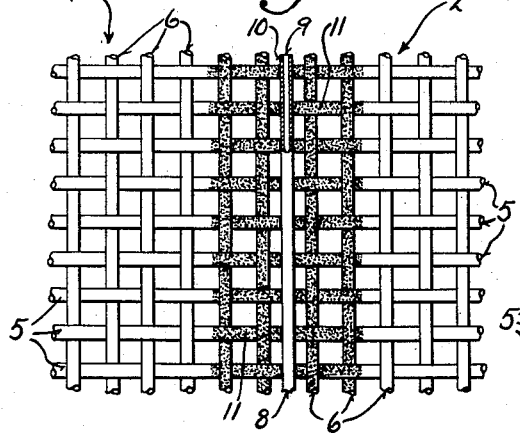 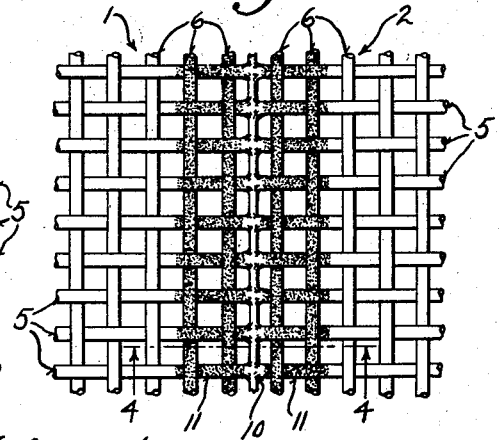
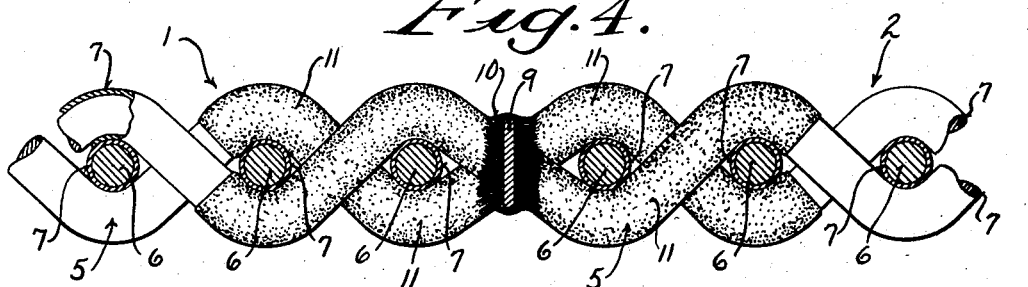
INVENTOR
John P. Gerhauser
BY
Arthur H. Seidel
ATTORNEY

United States Patent Office 2,893,664
Patented July 7, 1959

2,893,664

SEAM FOR WIRE FABRIC AND METHOD OF MAKING SAME

John P. Gerhauser, Appleton, Wis., assignor, by mesne assignments, to Appleton Wire Works Corp., Appleton, Wis., a corporation of Wisconsin Application March 16, 1955, Serial No. 494,709

4 Claims. (Cl. 245—10)

This invention relates to the manufacture of seams for wire fabric, and it more specifically resides in a method of forming a seam with a fusible material in which a supplementary metallic covering is placed on the threads of the fabric adjacent the edges to be joined and the fusible material is then melted and caused to flow over the threads to produce a bond, upon cooling, that firmly joins the edges.

Wire fabrics that are closed upon themselves in the form of endless belts, such as Fourdrinier wires, are usually formed with brazed or soldered seams. Such seams must exhibit strength characteristics comparable to that of the fabric proper, and must be free of irregularities or protrusions. Several methods of producing satisfactory brazed or soldered seams for wires of bronze and brass threads have been proposed and adopted. Exposed bronze and brass threads, however, cannot be tolerated in working with some pulp materials since appreciable traces of copper are injurious to these particular materials.

As a consequence, if bronze and brass threads are to be employed in Fourdrinier wires used with such pulp they must be coated to encase the copper. An alternative is to resort to different thread materials, however, threads of copper content, such as the bronzes and brasses, are most desirable and coating of these threads with a metal such as tin is consequently as desired practice.

A coating on the threads adversely affects the formation of brazed or soldered seams. Certain of the coating materials that may be advantageously employed are characterized by melting and flow point temperatures well beneath those temperatures encountered in the heating of the solders employed. As a result, the protective coating adjacent the edges being joined melts and flows. Fillets of the coating material are formed where the warp and weft threads cross one another, and upon resolidifying areas of stiffness are formed in the wire that are subject to detrimental wear. The life of a Fourdrinier wire is thereby adversely affected, to a degree that brazed or soldered seams are not satisfactory.

In the present invention a method of forming a brazed or soldered seam is employed wherein a preliminary metallic deposit is placed over the coated threads to jacket the coating adjacent the edges to be joined. The solder may then be heated and permitted to flow at the edges of the wire to form a firm bond having the requisite strength for the seam.

It is an object of this invention to provide a brazed or soldered seam of high strength for wire fabric comprised of coated threads.

It is another object of this invention to eliminate the flow of a low melt coating on the threads of a wire fabric during the formation of a brazed or soldered seam.

It is another object of this invention to jacket coated threads of adjacent edges of a wire fabric to be joined with a metallic deposit before the application of heat to enhance the seam formed for joining the edges.

It is another object of this invention to provide a method of forming a seam for wire fabric in which there is no detrimental effect to threads of the fabric.

These and other objects and advantages of this invention will appear in the description to follow. In the description reference is made to the accompanying drawing, which forms a part hereof, and in which there is shown by way of illustration and not of limitation a specific manner in which this invention may be carried out.

In the drawing:

Fig. 1 is a fragmentary view of two margin areas of a wire fabric to be joined by a seam in accordance with this invention, Fig. 2 is a fragmentary view of the portions of the fabric in Fig. 1 showing a metallic deposition adjacent the edges to be joined, and between which there is placed a strand that includes a solder employed in producing the seam, Fig. 3 is a fragmentary view of the portions of the fabric in Figs. 1 and 2, with a seam joining the portions that has been formed in accordance with this invention, and Fig. 4 is a view in cross section of the seam shown in Fig. 3 taken on the plane 4—4.

Referring now to the drawing, and more particularly Fig. 1, there is shown portions of the two ends 1 and 2 of a Fourdrinier wire which are to be joined along their edges 3 and 4 to form the characteristic endless belt upon which pulp material is deposited to form a web. In the Fourdrinier wire shown the warp threads 5 and weft threads 6 are coated with a metal that will not be injurious to the particular pulp material for which the wire will be utilized. For example, certain rayon pulp is detrimentally affected if it is brought into contact with substantial traces of copper. As a consequence, it is necessary to provide Fourdrinier wires for these pulps that have chemically inert thread surfaces free of copper. To meet the requirement of such pulp it is desirable to employ warp and weft threads of the usual bronze and brass materials that are coated. In this fashion the highly advantageous characteristics of bronze and brass threads may be retained. The warp threads 5 and weft threads 6 may be coated prior to the weaving of the wire and for the purpose of illustration, a coating of tin 7 is shown in Fig. 4, that has been applied by a hot dip to both the warp threads 5 and the weft threads 6. Tinning of the threads is advantageous in several respects, first such a coating exhibits satisfactory wear properties, and secondly it may be applied without appreciable loss of metal due to vaporization upon melting for the hot dip.

To form the seam joining the Fourdrinier ends 1 and 2 the ends of the warp threads 5, along the edges 3 and 4, are carefully trimmed to present straight edges parallel to the weft threads 6 in which the individual warp threads 5 are neither curled nor bent from the position as woven. The edges 3 and 4 are then brought closely adjacent one another so that a strand 8, as shown in Fig. 2, may be interposed between the edges 3, 4. The strand is comprised of a thin central ribbon 9 of non-fusible material surrounded by a fusible solder 10. An alternative form that may be employed is a ribbon of solder without an accompanying non-fusible material.

The solder 10 may comprise a suitable, fusible material that upon heating and melting will flow over the ends of the warp threads 5 to form a bond, upon cooling, that will join the ends 1 and 2 of the Fourdrinier wire, with the ribbon 9 therebetween, with a seam exhibiting requisite strength and life characteristics. It is the common practice to employ silver solders, and an example of a typical silver solder is a mixture of 60% silver, 25% copper and 15% zinc. This solder has a melting point of 1260° F. and a flow point of 1325° F. The silver solders have melting points falling generally within the range of 1175–1500° F. and the flame of a torch is usually passed over the solder to impart the necessary heat. The area of heating will extend to either side of the strand 8 and raise the temperature of the adjacent warp threads 5 and weft threads 6.

Temperatures encountered in silver soldering, or brazing, are considerably above the melt and flow temperatures of the tin coat 7 on the threads 5 and 6. The melting point of tin is 439° F., and if a coating of zinc had been employed the melting point would be 786° F. An aluminum coat would melt at 1220° F. Thus, the necessary heating of the solder 10 will cause a melting of the thread coating along the margins adjacent the edges 3 and 4. Such melting is detrimental, in that the coating 7 will run and form fillets at the junctions of the warp and weft threads 5, 6. Upon cooling the fillets will harden and bond the warp and weft threads to one another so as to stiffen the Fourdrinier wire. This stiffening increases the wear at this portion of the wire and the life of a wire is consequently reduced.

In the method of forming a seam of this invention, a thin layer of metal having a melting point temperature greater than temperatures encountered in heating the fusible solder, is deposited upon the warp and weft threads 5, 6 adjacent the edges 3 and 4. A convenient manner of making this deposit is to paint upon the threads 5, 6 a solution of a metallic salt containing a metal lower in the electromotive series than that of the coating 7. For example, in the instance of the Fourdrinier wire shown in the drawing a solution of copper sulphate is applied, that contains 10% copper sulphate with a small addition of sulphuric acid. The tin of the coating 7, being more active in the electromotive series than the copper, will go into solution and the copper ions of the solution will be deposited upon the threads 5, 6 so as to encase the margins areas of the ends 1 and 2 of the Fourdrinier wire in a thin metallic jacket 11. This jacket 11 of copper has a melting point temperature of approximately 1976° F., which is in considerable excess of the solder flow point temperature.

After the chemical deposit of the copper is completed the threads 5, 6 are dried and and the edges 3 and 4 may now be brought closely to one another and the strand 8 interposed therebetween, as shown in Fig. 2. A torch is then brought to bear upon the strand 8, in the usual manner. The torch will melt the silver solder, which will flow to form a thin film of solder surrounding the ends of the warp threads 5 and the ribbon 9. The edges 3 and 4 are retained close to one another, and are urged toward the ribbon 9 to minimize the space therebetween.

As heat is applied the copper jacket 11 deters any appreciable flowage of the tin plate 7, even though the flow point temperature of the tin 7 is exceeded. The solder 10 flows over only a small portion of the metallic jacket 11, and the major area portions of the jacket 11 remain exposed after formation of the seam, since the area in which flowage of the coating 7 must be inhibited by the jacket 11 is greater than the areas directly included in the finished seam. Upon cooling, a seam is completed, as shown in Figs. 3 and 4, that exhibits desirable characteristics as heretofore had in the instance of uncoated bronze and brass threads.

The amount of copper exposed on the finished Fourdrinier wire is relatively insignificant, and in the processing of pulp there will be no adversity thereto. The layer of copper deposit 11 along the margins of the Fourdrinier ends 1 and 2 therefore need not be removed upon completion of the seam. If desired a metal other than copper may be deposited upon the coating 7, for example a silver deposit may be made in a similar fashion with the result that there will be no copper exposed upon the completion of the seam.

The deposit 11 may be made in a manner other than by a chemical deposition, based upon the relation of the coating metal and metal to be deposited in the electromotive series. Electro-plating, for example, may be employed to build the deposit. The deposit 11 is thin, so as not to influence the flexibility of the Fourdrinier wire in the region of the seam, yet it is the discovery of this invention that a thin metallic deposit will inhibit the flow of a coating when subjected to heat that raises temperatures above the flow point of such coating.

I claim:

1. The method of producing a seam in a Fourdrinier wire formed of copper content threads coated with tin, which method comprises: applying a thin coating of copper over portions of the threads forming the margins along the edges to be joined by the seam; bringing the edges to be joined close to one another; placing a silver solder along the edges to be joined; and heating the solder to cause the solder to flow upon the threads to produce a firm bond upon cooling, wherein the copper coating acts as a jacket about the threads which inhibits flow of the tin coat beneath such jacket.

2. The method of producing a seam in a Fourdrinier wire formed of copper content threads coated with a metal from the group consisting of tin, zinc and aluminum, which method comprises: applying a thin layer of metal selected from the group consisting of copper and silver over portions of the threads forming margins along the edges to be joined by the seam; bringing the edges to be joined close to one another; placing a silver solder along the edges to be joined; and heating the solder to cause the solder to flow upon the threads to produce a firm bond upon cooling, wherein said thin layer acts as a jacket about the threads which inhibits flow of the coating metal beneath such jacket.

3. The method of producing a seam in a Fourdrinier wire formed of copper content threads coated with a metal from the group consisting of tin, zinc and aluminum, which method comprises: applying a thin layer of metal over portions of the threads forming margins along the edges to be joined by the seam, which metal has a substantially higher melting point temperature than the flow point temperature of silver solder and which is solderable by silver solder; placing silver solder along the edges to be joined; and heating the solder to cause the solder to flow upon the threads to produce a firm bond upon cooling, wherein said thin layer acts as a jacket about the threads which inhibits flow of the coating metal beneath such jacket.

4. In a seam for a Fourdrinier wire that is composed of warp and weft threads of copper content coated with a metal from the group consisting of tin, zinc and aluminum the combination comprising: a thin layer of metal selected from the group consisting of copper and silver deposited over the warp and weft threads adjacent the seam and extending inwardly from the seam to cover a plurality of rows of crossover knuckles between warp and weft threads; and a silver solder joining edges of the Fourdrinier wire to define the seam, which silver solder is confined to margin areas of the edges that are on the seam side of said rows of crossover knuckles.

References Cited in the file of this patent

UNITED STATES PATENTS

| | | |
|---|---|---|
| 580,344 | Griffith | Apr. 6, 1897 |
| 1,335,024 | Peschko | Mar. 30, 1920 |
| 1,555,296 | Kirschner | Sept. 29, 1925 |
| 1,765,932 | Meylein | June 24, 1930 |
| 1,949,593 | Weissenborm et al. | Mar. 6, 1934 |
| 2,024,150 | Davignon | Dec. 17, 1935 |
| 2,117,222 | Sinclair | May 10, 1938 |
| 2,307,298 | Przyborowski | Jan. 5, 1943 |
| 2,311,885 | Taylor | Feb. 23, 1943 |
| 2,327,259 | Gay | Aug. 7, 1943 |
| 2,331,814 | Taylor | Oct. 12, 1943 |